United States Patent [19]
Capps et al.

[11] Patent Number: 5,487,054
[45] Date of Patent: Jan. 23, 1996

[54] METHOD AND APPARATUS FOR SETTING A CLOCK IN A COMPUTER SYSTEM

[75] Inventors: Stephen P. Capps, San Carlos; Martin R. Gannholm, Belmont, both of Calif.

[73] Assignee: Apple Computer, Inc., Cupertino, Calif.

[21] Appl. No.: 1,111

[22] Filed: Jan. 5, 1993

[51] Int. Cl.$^6$ .................................................. G04B 18/00
[52] U.S. Cl. ............................................ 368/185; 368/10
[58] Field of Search ............................ 368/10, 185–190

[56] References Cited

PUBLICATIONS

O'Connor, R. J., "Apple banking on Newton's brain," San Jose Mercury News, Apr. 22, 1992.
Weiman et al, "A Step Toward the Future" Macword, Aug. 1992, p. 129.
M. Soviero, "Your World According to Newton" Popular Science, Sep. 1992.
F. Abatemarco, "From the Editor" Popular Science, Sep. 1992, p. 4.
Pro Audio Spectrum 16 Utilities Guide, p. 35, 1993.

*Primary Examiner*—Bernard Roskoski
*Attorney, Agent, or Firm*—Hickman & Beyer

[57] ABSTRACT

A method for resetting a real-time clock of a pen-based computer system characterized by the steps of: displaying an image of an analog clock face with an hour hand and a minute hand on the screen of a pen-based computer system; determining whether a clock-setting stroke has been made with a stylus upon the image of the analog clock face; resetting the real-time clock to correspond to the clock-setting stroke; and moving at least one of the hour hand and the minute hand in response to the clock-setting stroke. An apparatus for resetting a real-time clock of a pen-based computer system is characterized by: a digital processor; a real-time clock coupled to the digital processor; a screen assembly coupled to the digital processor; a display mechanism for displaying an image of an analog clock on the screen assembly; a detection mechanism for detecting a clock-resetting stroke on the image of the analog clock by a stylus; and a resetting mechanism for resetting the real-time clock in response to the clock-resetting stroke.

7 Claims, 11 Drawing Sheets

METHOD AND APPARATUS FOR SETTING A CLOCK IN A COMPUTER SYSTEM

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based computer system. A pen-based computer system is typically a small, hand-held computer where the primary method for inputting data includes a "pen" or stylus. A pen-based computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus across the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. Besides serving as a notepad, pen-based computers can provide a number of useful functions, such as serving as an address book, an appointment calendar, a to-do list, etc.

Most personal computer systems (including pen-based computer systems) include a real-time clock which provides time and date information. Real-time clocks are useful for date and time stamping documents and folders, and for providing current date and time information to application programs such as the aforementioned appointment calendar and to-do list. Real-time clocks are typically battery powered independently of the remainder of the computer system circuitry so that they don't have to be reset every time the computer system cycled off and then on.

Real-time clocks do, nevertheless, have to be reset from time to time. For example, if the battery powering the real-time clock dies, the real-time clock will have to be reset after the battery is replaced. The real-time clock also is frequently reset at the switch-over between Daylight Savings Time and Standard Time, and when the computer system is moved to a new time zone.

In the prior art, real-time clocks are often reset by typing in a new time or date from a keyboard. An example of an entry screen for resetting a real-time clock is as follows:

Current time: 08:14:30
New time: (HH:MM:SS): __:__:__

The new hour, minutes and seconds are typed in, and the system real-time clock is reset.

Alternatively, some pointer based computer systems provide up and down arrows which permit a digital display of a real-time clock to be reset. An example is as follows:

Time: 08:14:30 ⇑⇓

The clock is reset by first selecting either the hour, minutes, or seconds from the digital display with the pointer and then selecting either the up arrow ⇑ or the down arrow ⇓ with the pointer to scroll the selected hour, minutes or seconds up or down, respectively.

The first of these two methods for resetting a real-time clock is not particularly attractive for pen-based computer systems, since it is more suited for keyboard entry than stylus entry. The second of the two methods is suitable for pen-based computer systems, but does not take advantage of the rich graphical potential of pen-based computer systems.

SUMMARY OF THE INVENTION

The present invention provides an easy-to-use, intuitive, graphical method and apparatus for resetting a real-time clock in a computer system. The method and apparatus are particularly well adapted to pen-based computer systems.

A method in accordance with the present invention for setting a clock in a computer system includes the steps of: displaying an analog clock face on the screen of a computer system; moving a pointer mechanism across at least a portion of the clock face to indicate a change in time; and resetting the real-time clock in response to indicated change in time.

The movement of the pointer mechanism can take a number of forms. For example, the pointer mechanism can form a stroke on the clock face to indicate a new hand position for either the hour hand or the minute hand of the clock face. Alternatively, the pointer mechanism can be used to drag a selected clock hand to a new position.

A method particularly adapted for a pen-based computer system includes the steps of: displaying an image of an analog clock on the screen of a pen-based computer system with an image of an hour hand corresponding to the current hour in a real-time clock and an image of a minute hand corresponding to the current minute in the real-time clock; determining whether a clock-setting stroke has been made with a stylus upon the image of the analog clock face; resetting the real-time clock to correspond to the clock-setting stroke; and moving at least one of the hour hand and the minute hand in response to the clock-setting stroke.

An apparatus for resetting a real-time clock of a pen-based computer system includes: a digital processor; a real-time clock coupled to the digital processor; a screen assembly coupled to the digital processor; a display mechanism for displaying the image of an analog clock on the screen assembly; a detection mechanism for detecting a clock-resetting stroke on the image of the analog clock by a stylus; and a real-time clock resetting mechanism for resetting the real-time clock in response to the clock-resetting stroke.

These and other advantages of the present invention will become apparent upon a reading of the following descriptions and a study of the various figures of the drawing.

BRIEF DESCRIPTION OF THE DRAWINGS

FIG. 2b is a view of the screen of FIG. 2 with the "preferences" screen selected from the extras drawer of FIG. 2a;

DETAILED DESCRIPTION OF THE PREFERRED EMBODIMENTS

The present invention is well suited for pointer based computer systems such as the pen-based, stylus-based and mouse-based systems that are currently popular. For the purposes of illustration, the invention will be described in connection with a pen-based system.

Figure 1:
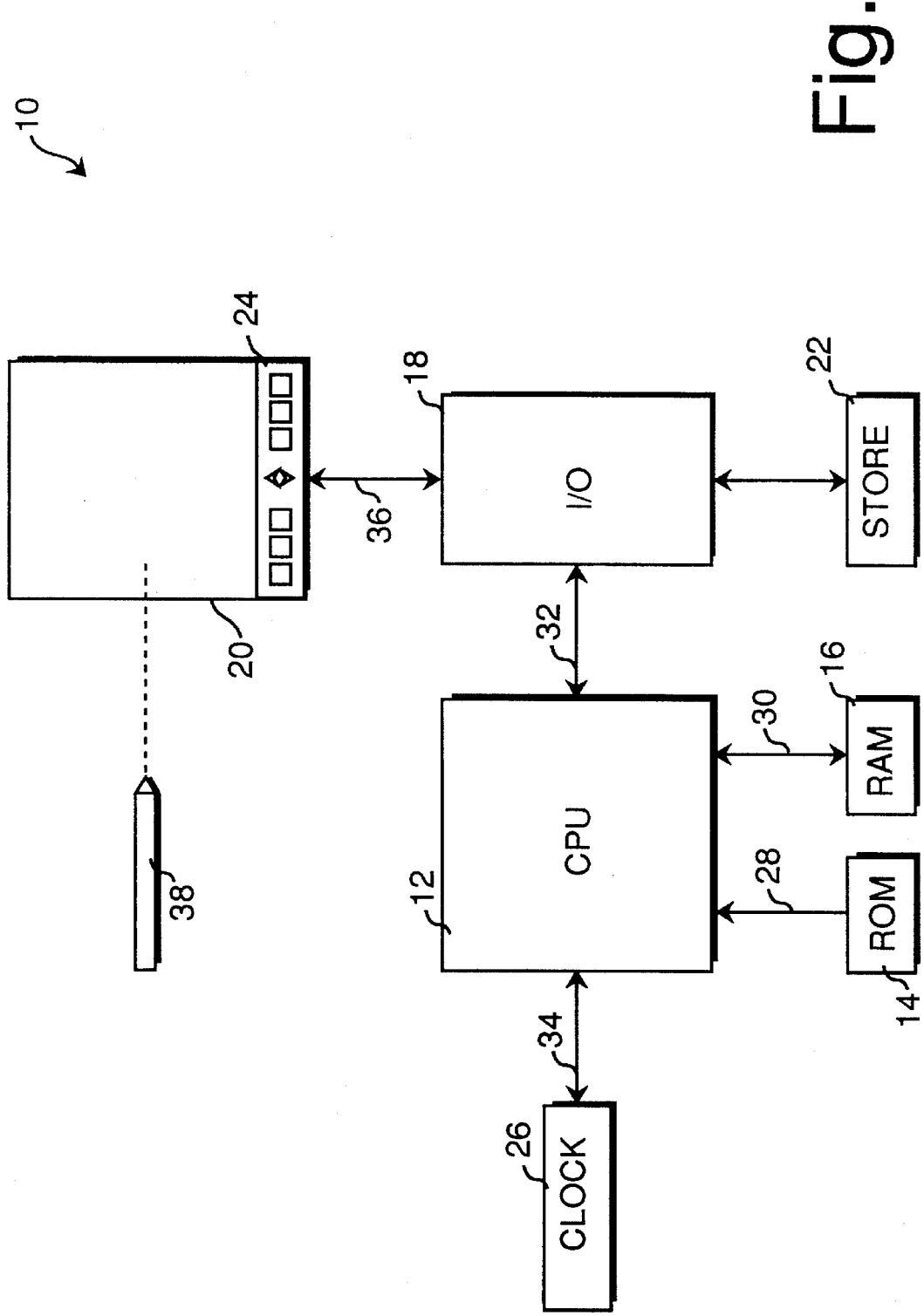
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 also includes a mass storage unit 22 such as a disk drive unit or nonvolatile memory such as flash memory, a keypad 24, and a real-time clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 1.6 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 is preferably a real-time clock chip that is coupled to CPU 12 by a data line 34. The clock chip is preferably separately battery-powered from the CPU 12 so that the real-time data stored in the clock chip is no lost when the remainder of the system 10 is shut down.

A typical real-time clock 26 starts counting seconds or fractions of a second when it is first coupled to its battery power supply. Real-time clocks can count up to a tremendously large number of seconds, typically in the order of $2^{64}$. The current count number CURRCOUNT can be set by the CPU 12 to any arbitrary value between the minimum and maximum count number, i.e. $0<CURRCOUNT<2^{64}$. A CURRCOUNT of zero is set to arbitrary time and date. In the present invention, that arbitrary date is Jan. 1, 1904 at 12:00 midnight. Therefore, if real-time clock 26 is counting seconds, Jan. 2, 1904 at 12:00 midnight will correspond to a CURRCOUNT of 60*60*24=86400. Jan. 1, 1905 at 12:00 midnight is 60*60*24*365=31536000.

It therefore follows that to set clock 26 to any current date and time, the correct CURRCOUNT must be loaded into clock 26 from CPU 12. Calculating CURRCOUNT is a straight-forward matter, although leap-years and possibly leap-centuries must be taken into account. Algorithms for calculating the appropriate CURRCOUNT given a known current date and time and a known date at time corresponding to a CURRCOUNT=0 are well known to those skilled in the art.

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position sensitive membranes are also readily available on the commercial market. Combination display assemblies such as display assembly 20 which include both the LCD and the input membrane are available from such vendors as Scriptel Corporation of Columbus, Ohio.

The keypad 24 can comprise an array of switches. In the present embodiment, the keypad 24 comprises mechanical buttons which overlie the bottom edge of the membrane which covers the LCD display. When the buttons are depressed, the membrane senses the pressure and communicates that fact to the CPU 12 via I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, nonvolatile memory such as flash memory, battery backed RAM, PC-data cards, or the like.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
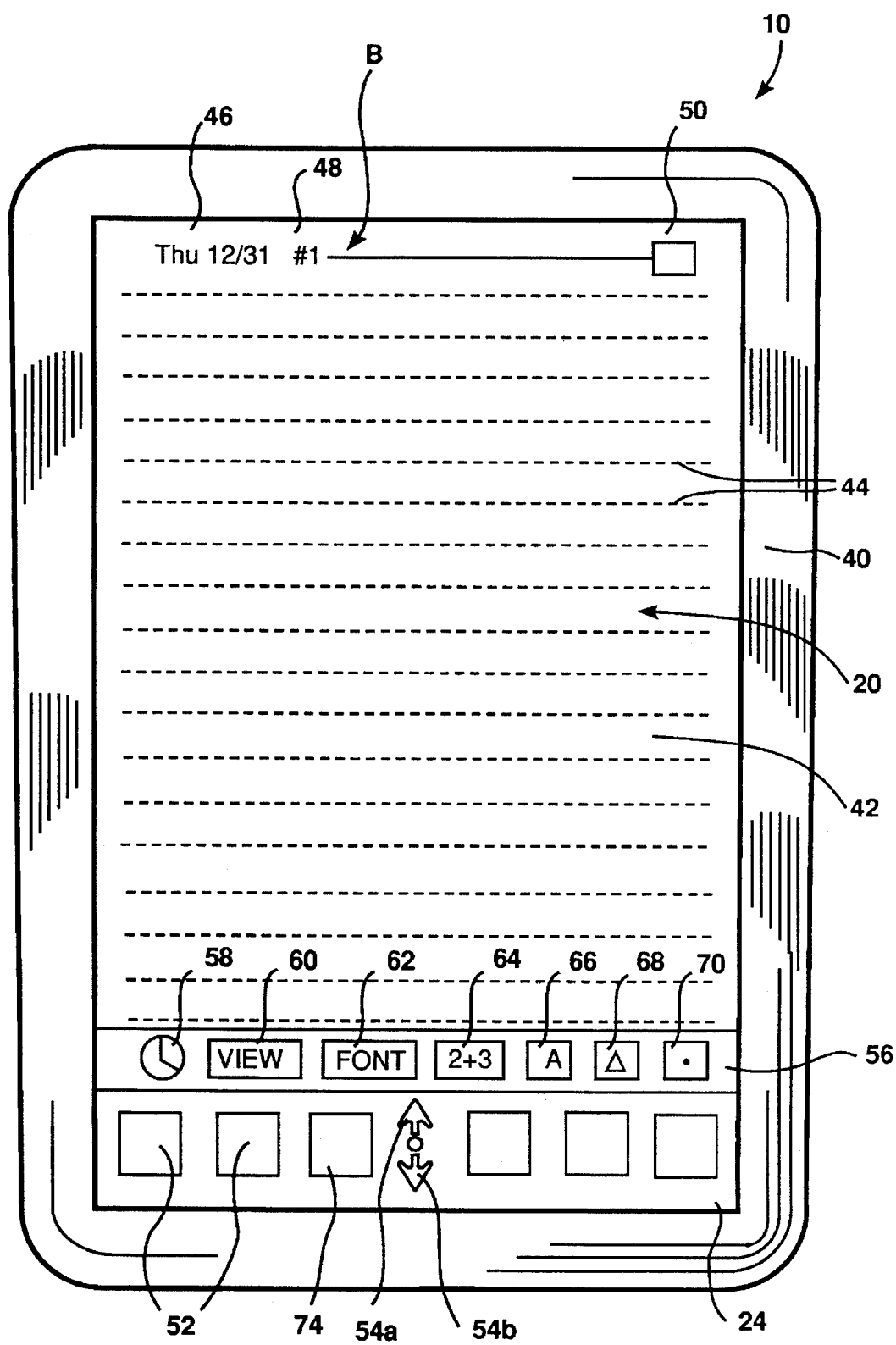
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a breaker bar B and a number of guidelines 44. The breaker bar B preferably includes the day and date of creation 46 of the note N, a note number 48, and a "router" button 50 which allows notes to be dispatched to a printer, facsimile, the trash, etc. The optional guidelines 44 aid a user in entering text, graphics, and data into the pen-based computer system 10.

In this preferred embodiment, the keypad 24 is not a part of the viewing screen 42 but rather, is a permanent array of input buttons coupled to the CPU 12 by I/O circuitry 18. Alternatively, the keypad 24 could comprise "soft buttons" generated at a convenient location on the screen 42, in which case a "button" would be activated by touching the stylus to the screen over the image of the button. The keypad 24 preferably includes a number of dedicated function buttons 52 and a pair of scroll buttons 54A and 54B. The operation of the scroll buttons 54A and 54B, and other aspects of computer system 10 are discussed in greater detail in co-pending U.S. Pat. application 07/868,013, filed Apr. 13, 1992 now U.S. Pat. No. 5,398,310, issued Mar. 14, 1995, on behalf of Tchao et al. and entitled "Method for Manipulating Notes on a Computer Display". That application is assigned to the assignee of the present application and its disclosure is hereby incorporated by reference in its entirety.

The screen illustrated in FIG. 2 is referred to as the "notepad", and is an application program running under the operating system of the pen based computer system. 10. In this preferred embodiment, the notepad is a special or "base" application which is always available beneath higher level applications. The notepad application, like other applications, run within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a clock display 58, a view button 60, a font button 62, a formulas button 64, a text button 66, a graphics button 68, and a nib button 70. Co-pending patent application U.S. Ser. No. 07/976,970, filed Nov. 16, 1992 now U.S. Pat. application Ser. No. 08/393,880 filed Feb. 24, 1995, on behalf of Foster et al., entitled "Status Bar for Application Windows" and assigned to the assignee of the present invention describes the operation of the status bar, and is hereby incorporated herein by reference in its entirety.

Figure 2A:
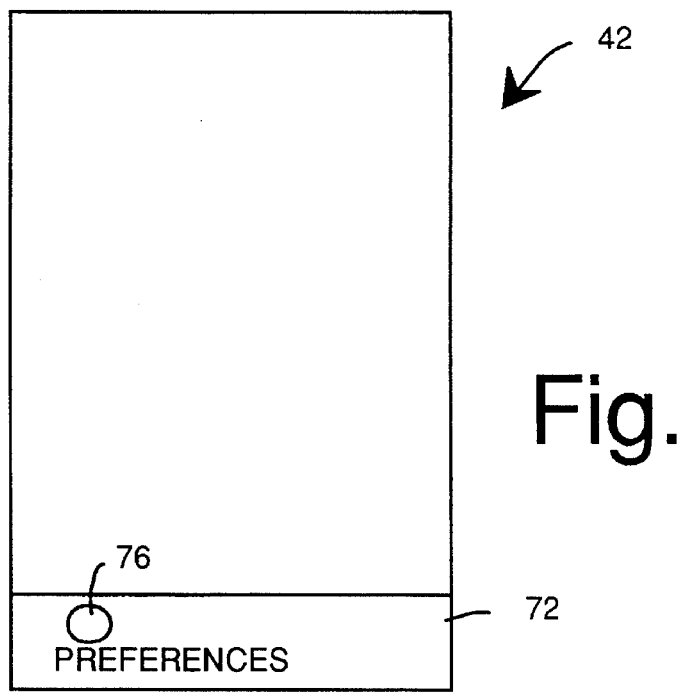
FIG. 2a is a view of the screen of FIG. 2 with an "extras" drawer opened.

In the present invention, the real-time clock 26 is accessed via a "preferences" button in an "extras" drawer. With reference to FIG. 2a, which is a view of screen 42, an "extras" drawer 72 is opened at the bottom of the screen 42 by pressing an extras button 74 of keypad. 24 (see FIG. 2). Once the extras drawer 72 is opened, an number of options will be available, including a "preferences" button 76. When the preferences button 76 is engaged with the tip of stylus 38, a preferences screen will appear on screen 42, as illustrated in FIG. 2b.

Figure 2B:
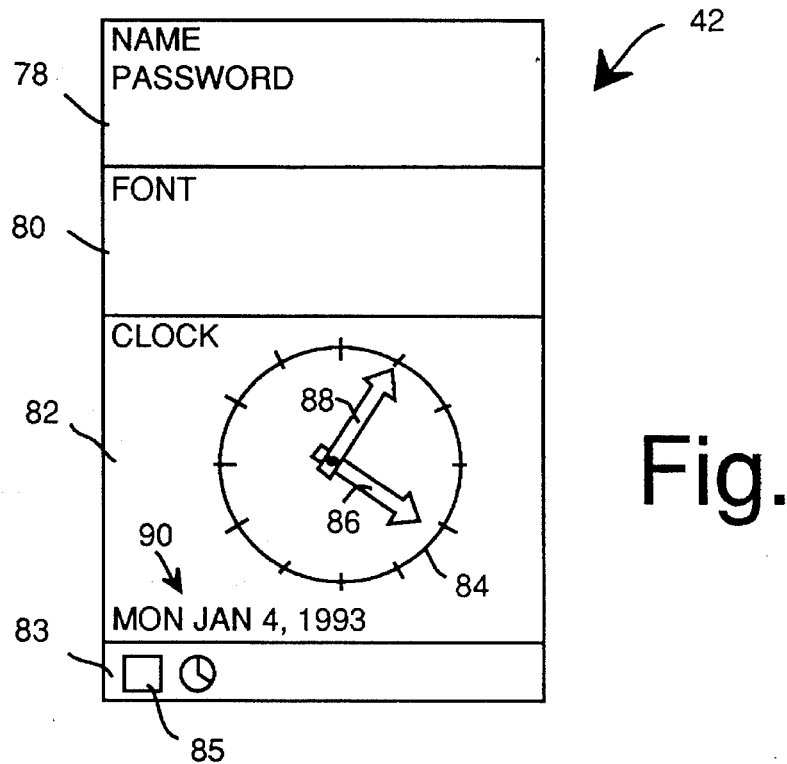

As seen in FIG. 2b, the preferences screen includes a number of sections including sections 78, 80, and 82. The preferences screen also includes a status bar 83 having a close box 85 for closing the preferences screen. Section 78 allows a user's name and password to be entered or changed. Section 80 permits default font selections to be made. Section 82 allows for the setting of the real-time clock 26 in accordance with the present invention.

In section 82, an image of an analog clock face 84 is displayed. The analog clock face includes an hour hand 86 and a minute hand 88. Also, preferable, the current date is displayed within section 82, as indicated at 90. The current date can be changed by methods not a part of this invention, but well known to those skilled in the art.

Figure 3:
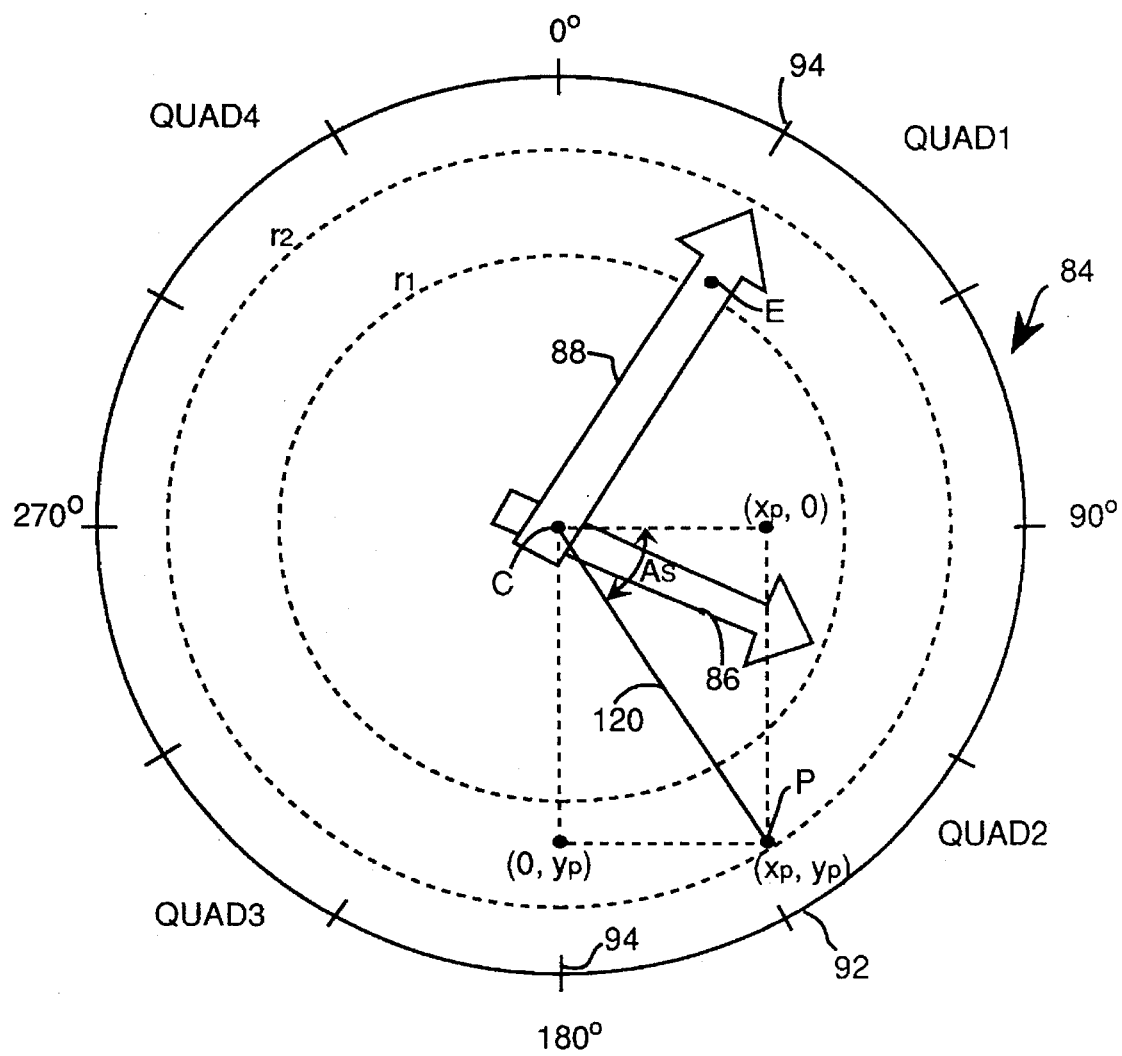
FIG. 3 is an enlarged view of the analog clock face from the clock section of the preferences screen of FIG. 2b.

FIG. 3 illustrates the analog clock face 84 and hands 86 and 88 in greater detail. The clock face 84 includes a perimeter 92, and preferably includes a number of minute-markers 94. The remaining indicia on FIG. 3 will be used to describe the operation of the present invention, and preferably does not appear as part of the image of clock face 84.

Figure 4:
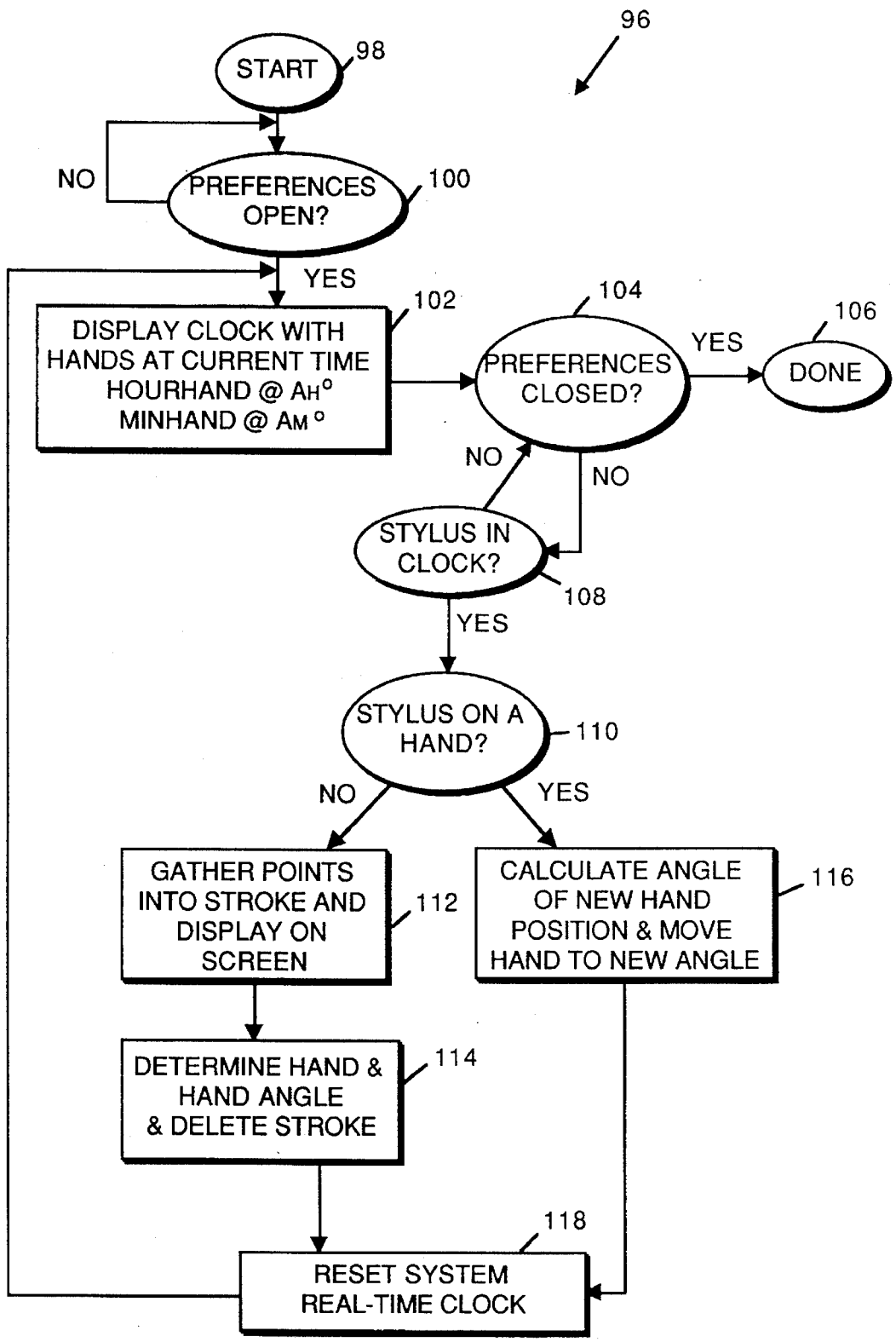
FIG. 4 is a flow diagram of a process for resetting a real-time clock utilizing the analog clock face of FIG. 3.

FIG. 4 illustrates a process 96 for resetting a real-time clock in a pen-based computer system in accordance with the present invention. The process 96 begins at 98 and, in a decision step 100, it is determined whether the preferences screen is open. Again, in the present embodiment this is preferably accomplished by selecting the preferences button 76 from the extras drawer 72. If a clock set has been requested, a step 102 displays an image of an analog clock face 84 with hour hand 86 and minute hand 88 set for the time currently in the real-time clock 26. Step 102 also calculates or retrieves the current angles of the hour hand 86 ($A_H°$) and the minute hand 88 ($A_M°$). As seen in FIG. 3, in the present invention 0° is at 12:00, 90° is at 3:00, 180° is at 6:00, and 270° is at 9:00.

The drawing of the clock face 84 is easily accomplished using a graphics routine such as QUICKDRAW from Apple Computer, Inc. of Cupertino, Calif. A description of the QUICKDRAW graphics software is found in the book *Inside Macintosh, Volumes I, II, and III,* by C. Rose et al., Addison-Wesley Publishing Company, Inc., July 1988. With such graphics software, a line can be drawn by simply specifying the coordinates of the beginning and the end of the line and by specifying the nib. It is similarly straight-forward to draw simple shapes, such as perimeter 92 of clock face 84.

Next, in a step 104, it is determined whether the preferences screen has been closed by the engagement of the close box 85 with the tip of stylus 38. If it is, the procedure 96 is completed as indicated at 106. If the procedure 96 is not complete, a step 108 determines whether the stylus is in the clock face 84. If not, process control is returned to step 104.

If the stylus 38 is in the clock face 84, it is then determined in a step 110 whether the stylus is on a hand 86 or 88 of the clock face 84. If it is not, a step 112 gathers points corresponding to the movement of the stylus 38 across the screen 42 into a stroke, and displays the stroke on the screen. As stroke 120 made in this fashion is shown in FIG. 3. A step 114 then determines which hand of the clock is to be reset and the appropriate new hand angle. This step also erases any stroke made by a user on the clock face 84. Next, in a step 118, the system real-time clock is reset as indicated by the new hand angle, and process control is returned to step 102.

If step 110 determines that the stylus 38 is on a hand, then a step 116 calculates the angle of the new hand position as it is "dragged" by the stylus 38. Process control is then turned over to step 118.

Figure 5:
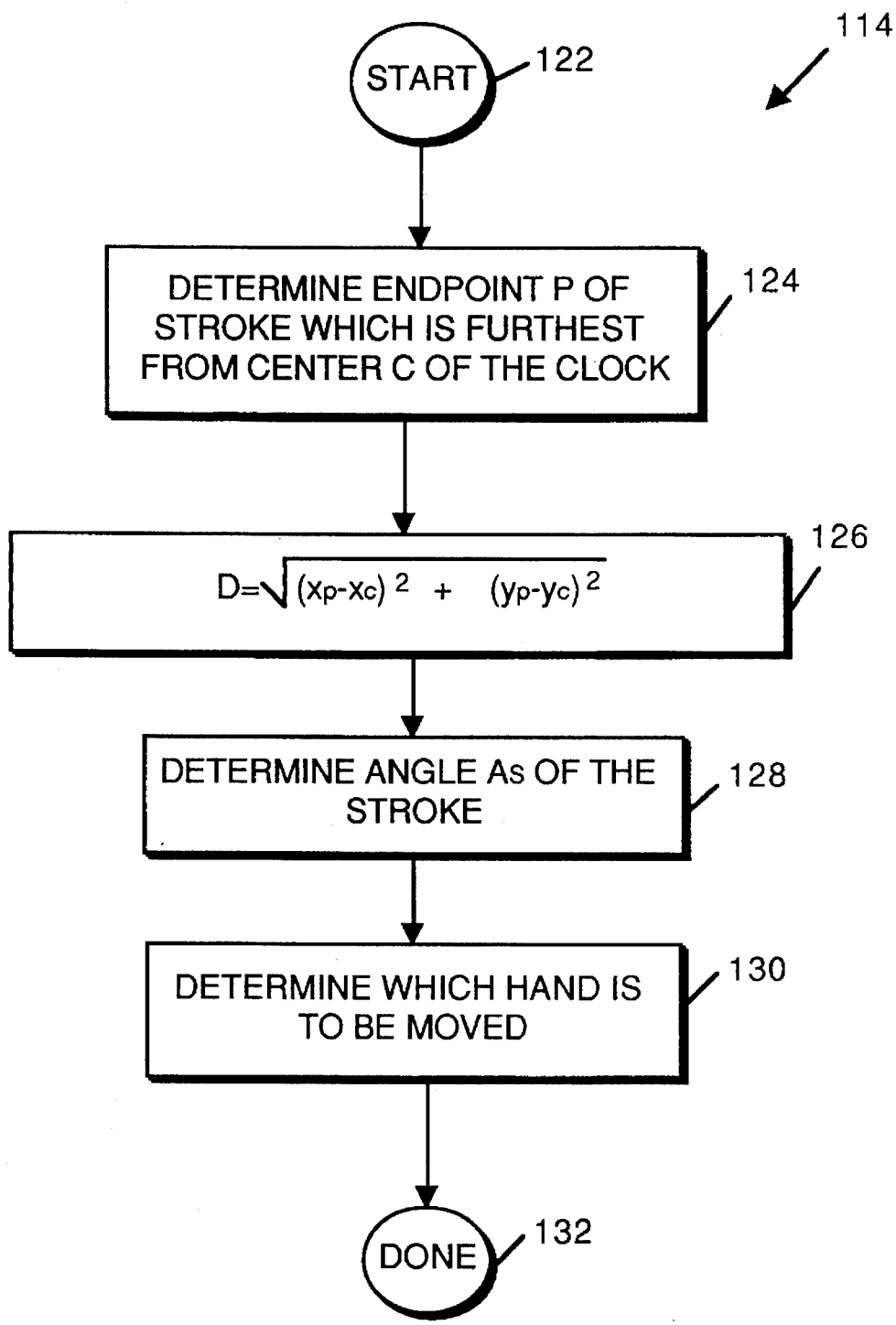
FIG. 5 is a flow diagram of a process for implementing the "Determine Hand and Hand Angle" step of FIG. 4.

FIG. 5 illustrates step 114 of FIG. 4 in greater detail. Process 114 begins at 122, and a step 124 determines the endpoint P (see FIG. 3) of stroke 120 which is farthest from the center C of the clock face 84. The distance D between C and P is easily calculated in step 126 as follows:

$$D = \sqrt{(x_p - x_c)^2 - (y_p - y_c)^2}$$

where the cartesian coordinates of P are $(x_c, y_c)$ and the cartesian coordinates of C are $(x_p, y_p)$. Next, in a step 128, the angle As of the stroke 120 is determined. Finally, in a step 130, it is determined which hand is to be moved. The process is completed at 132.

Figure 5A:
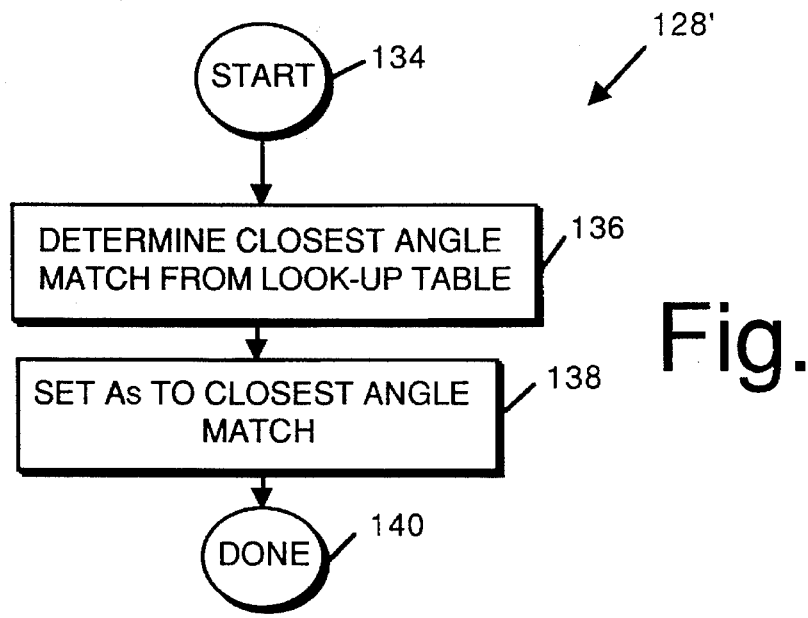
FIG. 5a is a flow diagram of a first process for implementing the "Determine Angle $A_s$" step of FIG. 5.

FIG. 5a illustrates a first process 128' for accomplishing step 128 of FIG. 5. The process 128' begins at 134 and, in a step 136, the closest angle is determined from a match into a look-up table. The closest angle match is set to $A_s$ in a step 138, and the process is complete at 140.

The most logical pointer into an angle look-up table is the absolute value of the slope of the stroke 120 which is easily calculated as follows:

$$m = |(y_p - y_c)|/|(x_p - x_c)|$$

Since the slope is always positive (due to the absolute value operators) a fifteen-entry lookup table can be used to give the degrees corresponding to the slope m in quadrant one to the closest 6° multiple of its actual angular position. This 6° corresponds to one minute of time on the clock. The fifteen values stored in the look-up table correspond to the arc tangents of m ranging from 0 to infinity, taken in fifteen equal steps.

Once an angle has been retrieved from the look-up table, it must be checked to see if the stroke falls within an quadrant other than quadrant one. For example, if $(x_p - x_c) > 0$ and $(y_p - Y_c) < 0$ then it is known that the stroke 120 was formed in quadrant two. In this instance, the angle can be set to 180 minus the look-up value. Similar calculations can be made for quadrants 3 and 4. If the angle from the look-up table is 360°, it can be reset to 0°.

Figure 5B:
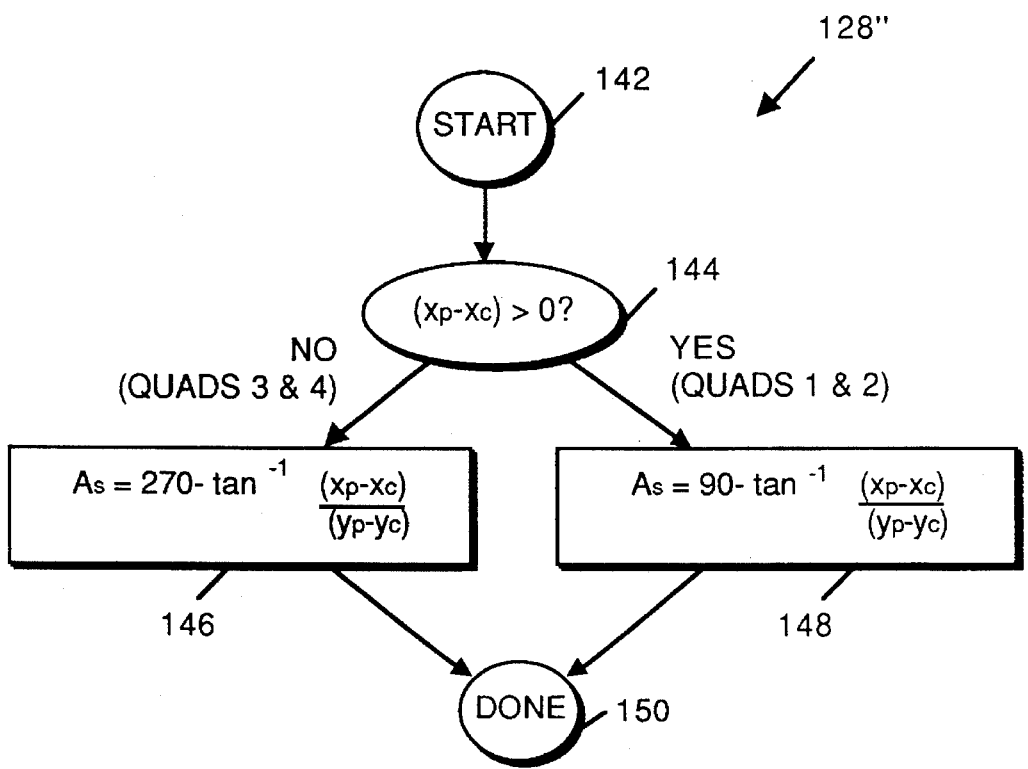
FIG. 5b is a flow diagram of a second process for implementing the "Determine Angle $A_s$" step of FIG. 5.

FIG. 5b illustrates a second process 128" for accomplishing step 128 of FIG. 5. The process starts at 142 and, in a step 144, it is determined whether the stroke 120 is in the first or second quadrant (i.e. on the right side of the clock face 84) or in the third or fourth quadrants (i.e. on the left side of the clock face 84). This is accomplished by simply determining whether $(x_p - x_c)$ is greater or less than zero. If step 144 determines the stroke is on the left side of clock face 84, the angle $A_s$ is calculated as:

$$A_s = 270 - tan^{-1}[(x_p - x_c)/(y_p - y_c)]$$

Alternatively, if step 144 determines the stroke is on the right side of clock face 84, the angle $A_s$ is calculated as:

$$A_s = 90 - tan^{-1}[(x_p - x_c)/(y_p - y_c)]$$

Of course, situation such as when $x_p = x_c$ and $y_p = y_c$ would have to be dealt with when using this formula approach, as is well known to those skilled in the art. For example, if $x_p = x_c$, then $A_s$ is 0° if $y_p > y_c$ and 180° in the reverse case. If $Y_p = Y_c$, then $A_s$ is 90° if $x_p > x_c$ and 180° in the reverse case.

Figure 6A:
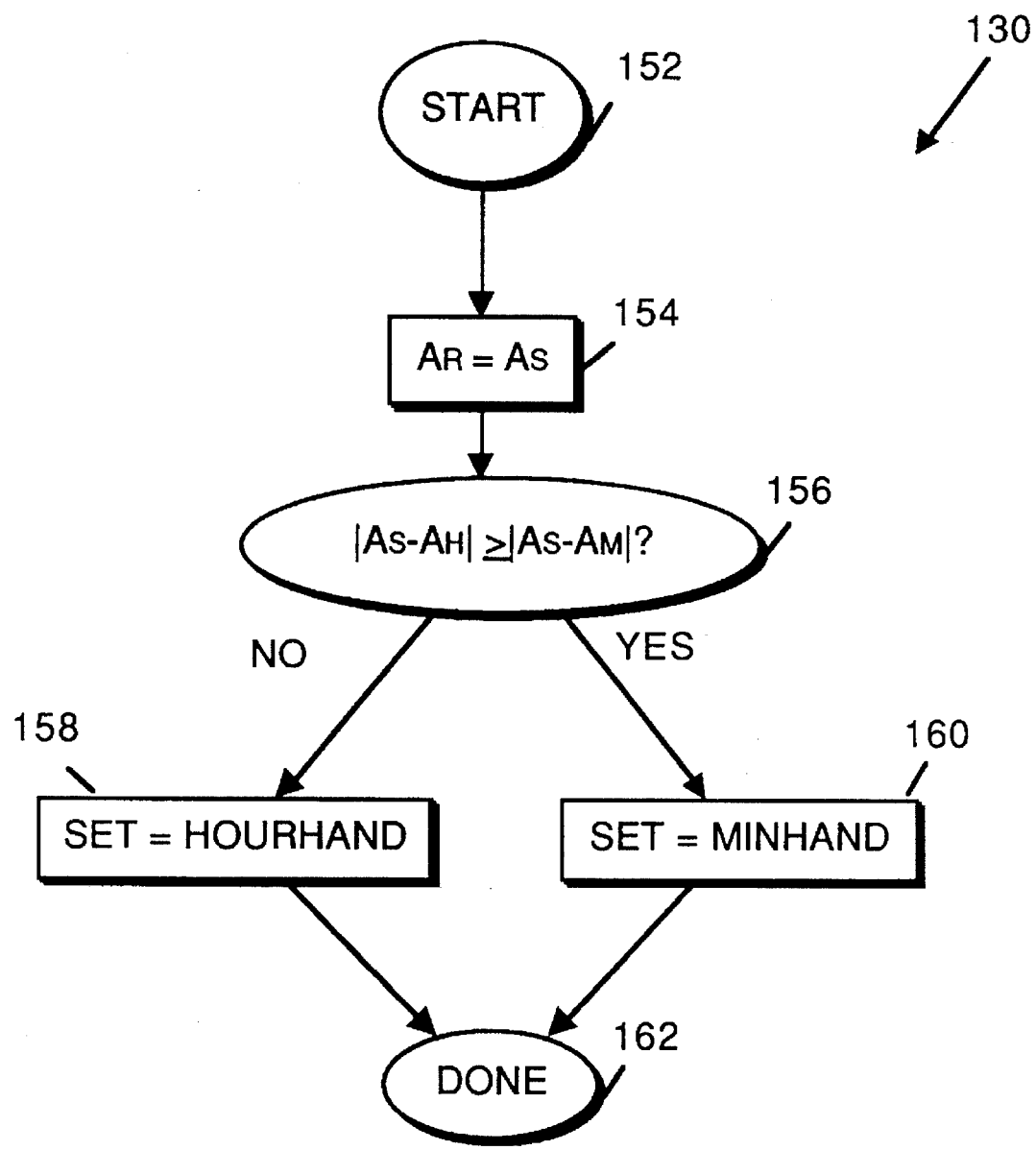
FIG. 6a is a flow diagram of a first process for implementing the "Determine Which Hand Is To Be Moved" step of FIG. 5.

FIG. 6a illustrates step 130 of FIG. 5 in greater detail. In process 7130, it is determined that the hand to be moved is the hand which is closest in angular separation to the stroke 120. The process 130 begins at 15 and, in a step 154, the angle Ar (which is the angle that the clock hand is to be reset to) is made equal to As (which is the angle of the stroke 120). Next, in a step 156, the absolute value of the angular separations of the stroke and the two hands of the clock are compared. If $|A_s - A_H| < |A_s - A_M|$ then the stroke is closer to the hour hand 86, and the variable SET is set to HOURHAND in a step 158. If $|A_s - A_H| \geq |A_s - A_M|$ then the stroke is closer to the minute hand 88, and the variable SET is set to MINHAND in a step 160. The process is completed as indicated at 162.

Figure 6B:
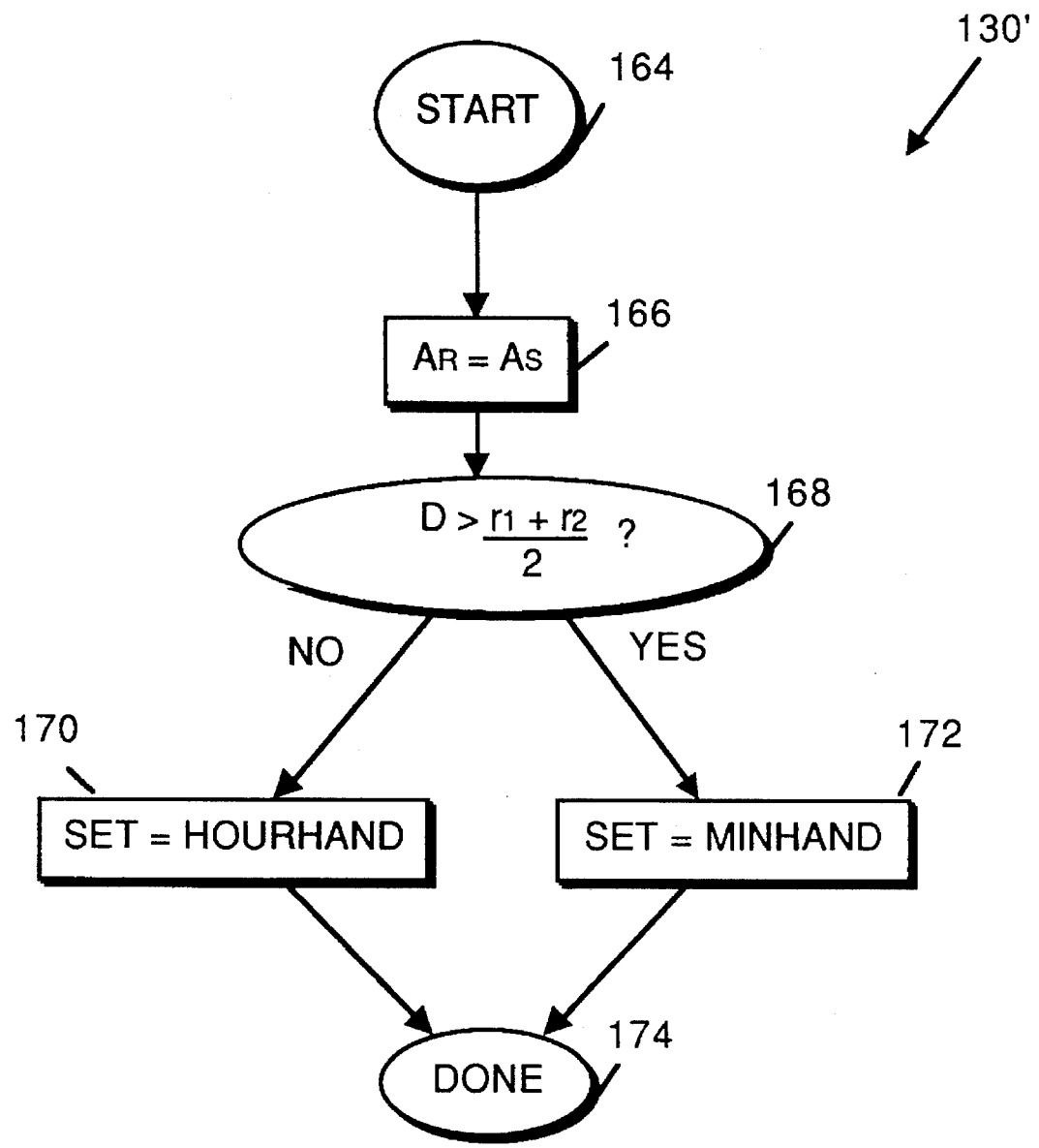
FIG. 6b is a flow diagram of a second process for implementing the "Determine Which Hand Is To Be Moved" step of FIG. 5.

FIG. 6b illustrates an alternative process 130' for the step 130 of FIG. 5. In this process, the hand that is closer to the stroke length D is considered to be the hand to be reset by the stroke 120. Referring briefly to FIG. 3, the hour hand 86 has a length $r_1$, and the minute hand 88 has a length $r_2$. Process 130' begins at 164 and, in a step 166, Ar is set to As as in step 154, above. Next, in a step 168, it is determined whether the hour hand 86 or the minute hand 88 is closer in length to the stroke 120. If $D \leq (r_1 + r_2)/2$, then the stroke length D is closer to the hour hand 86 and the variable SET is set to HOURHAND in a step 170. If $D > (r_1 + r_2)/2$, then stroke length D is closer to the minute hand 88 and the variable SET is set to MINHAND in a step 172. The process 130' is completed in a step 174.

Figure 7:
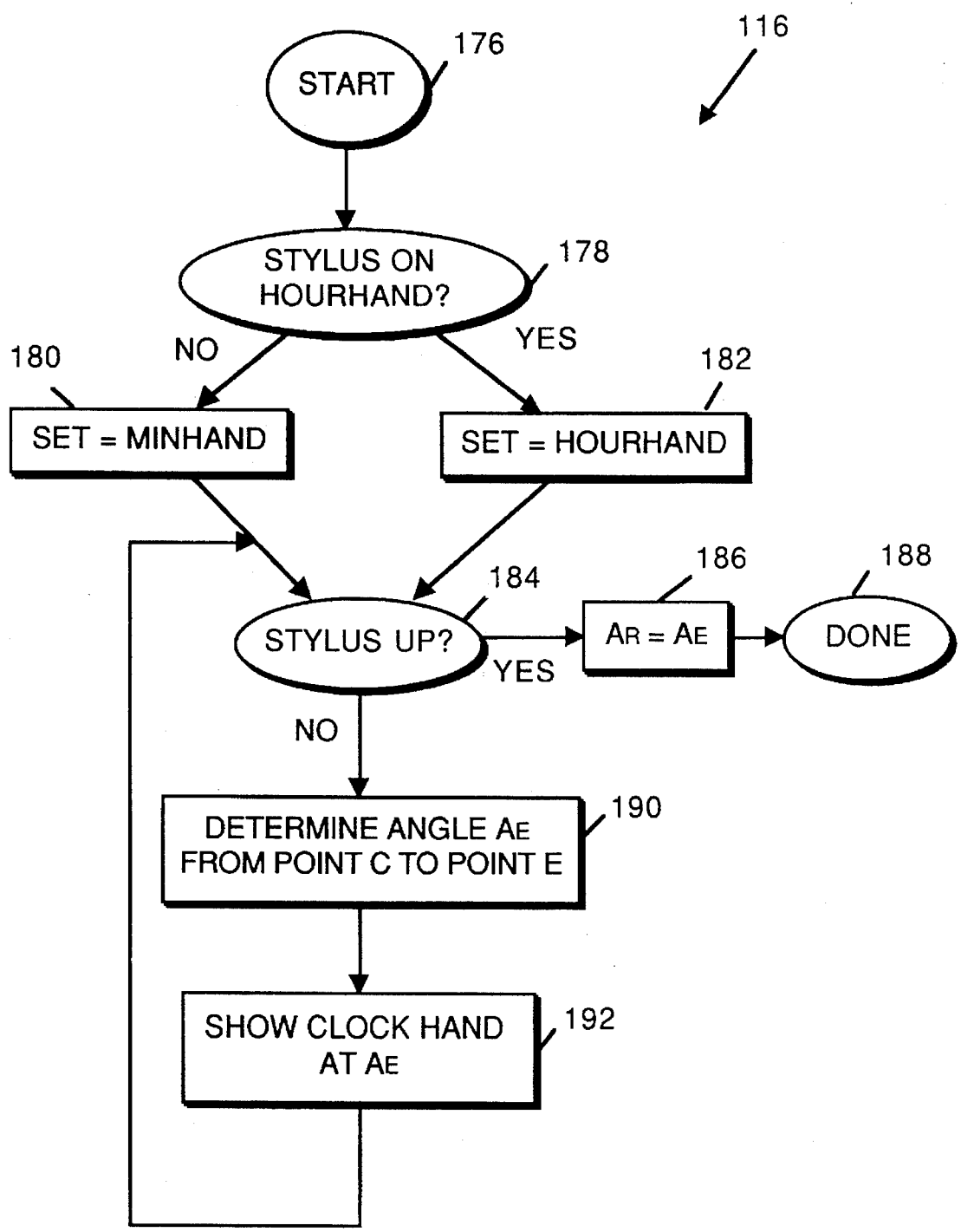
FIG. 7 is a flow diagram of a process for implementing the "Calculate Angle of New Hand Position" step of FIG. 4.

FIG. 7 illustrates step 116 of FIG. 4 in greater detail. In this instance, a user is changing a hand position of the clock face 84 by engaging one of the hands 86 and 88 with the tip of stylus 38 and moving the stylus across the clock face. This action causes a "dragging" motion which repositions the engaged hand of the clock.

Process 116 beings at 176 and, in a step 178, it is determined whether the stylus is on the hour hand. If it is not, the variable SET is set to MINHAND in a step 180, and if it is, the variable SET is set to HOURHAND in a step 182. In FIG. 3, the stylus is shown engaged with the minute hand 88 at point E. A step 184 then determines whether the stylus is up, i.e. whether it has been removed from the screen 42. If it is up, a step 186 set $A_R = A_E$, where $A_R$ is the reset angle, and $A_E$ is the angle of the line between points C and E. The process is then complete at 188.

If step 184 determines that the stylus is not up, a step 190 determines the angle $A_E$ from point C to point E. Again, the angle AE can be calculated using simple trigonometry or can be determined by a look-up table. Step 192 shows the clock hand at the new angle $A_E$ so that the hand appears to be "dragged" with the moving stylus. Process control is then returned to step 184.

Figure 8:
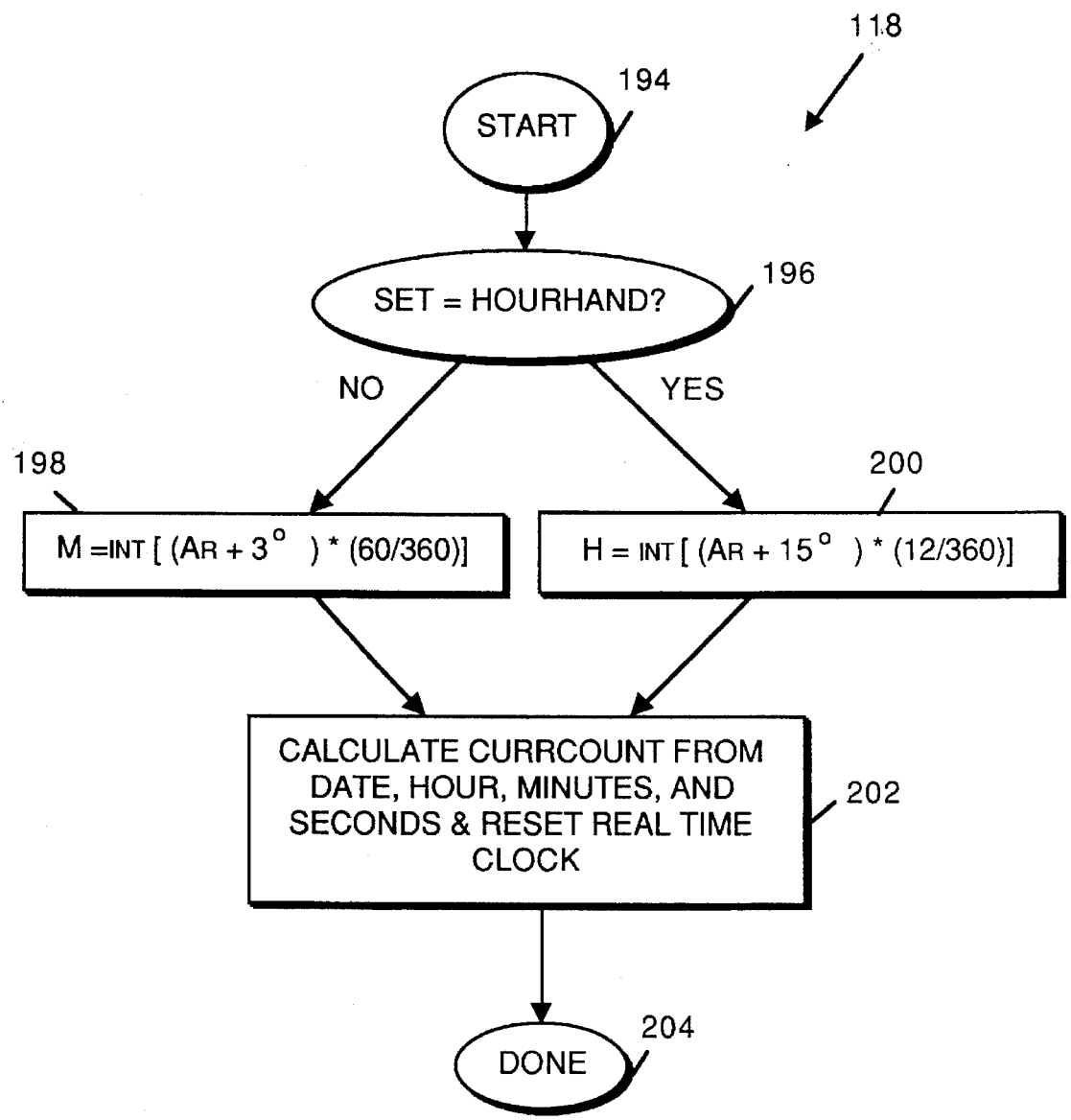
FIG. 8 is a flow diagram of a process for implementing the "Reset System Real-Time Clock" step of FIG. 4.

FIG. 8 illustrates step 118 of FIG. 4 in greater detail. The process 118 begins at 194, and a step 196 determines whether the variable SET is equal to HOURHAND. If it is not, the minutes of the clock are to be reset in a step 198 by the calculation $$M=INT[(A_R+3°)/6]$$

where M are the new minutes indicated on clock face 84. Otherwise, step 200 calculates the hour as $$H=INT[(A_R+15°)/30]$$

where H is the new hour indicated on clock face 84. The 3° in the equation of step 198 and the 15° in the equation of step 200 ensure the correct hour and minutes are calculated when they fall too close to the interface between two adjacent minutes or hours, respectively.

Next, in a step 202, the new CURRCOUNT is calculated from the system date, the current number of seconds, and the reset hour (H) or minutes (M). This new CURRCOUNT is transferred from CPU 12 to the real-time clock 26 to reset the real-time clock for system 10.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A method for setting a clock in a computer system comprising:

displaying an analog clock face on a screen of a computer system the clock face having an origin at a center location thereof, wherein said analog clock face displays an hour hand extending radially outwardly from said origin, said hour hand corresponding to a current hour parameter of a real-time clock, and further displays a minute hand extending radially outwardly from said origin, said minute hand corresponding to the current minute parameter of said real-time clock, said hour hand and said minute hand being different in length;

making a stroke on said screen using a pointer means by contacting the pointer means with at least a portion of said clock face;

determining whether the distance from the clock origin to a selected point in said stroke is closer to the length of said hour hand or length of said minute hand; and moving one of said hour hand and said minute hand to indicate a new hand position indicative of a new clock time, wherein the determination of which hand is to be moved is based at least in part upon whether the distance to the selected point of said stroke is closer to the length of the hour hand or the length of the minute hand; and resetting said real-time clock to correspond to said new clock time.

2. A method for setting a clock in a computer system comprising:

displaying an analog clock face on a screen of a computer system the clock face having a clock origin at a center location thereof, wherein said analog clock face displays an hour hand corresponding to a current hour parameter of a real-time clock, and further displays a minute hand corresponding to the current minute parameter of said real-time clock, said hour hand and said minute hand being different in length;

making a stroke on said screen using a pointer means by contacting the pointer means with at least a portion of said clock face to create a new hand position;

wherein each of said hour hand, said minute hand, and said stroke has a length, and further comprising the step of moving either the hour hand or the minute hand to said new hand position, depending upon which of said hour hand or said minute hand is closer in length to the length of the stroke comprising the new hand position to define thereby a new clock time: and resetting said real-time clock to correspond to said new clock time.

3. An apparatus for resetting a real-time clock of a pen-based computer system comprising:

digital processing means;

real-time clock means coupled to said digital processing means;

screen means coupled to said digital processing means and operative to display images in response to signals generated by said digital processing means and operative to provide signals to said digital processing means in response to the engagement of a surface of said screen means with a stylus means;

means for displaying an image of an analog clock on said screen means, said analog clock having a centrally located clock origin from which an hour hand and a minute hand extend radially outwardly;

means for detecting a clock-resetting stroke on said image of an analog clock by said stylus means;

means for determining whether the radial distance from a clock origin to a selected point in said clock resetting stroke is closer to the radial distance from said clock origin to an end of said hour hand or the radial distance from said clock origin to an end of said minute hand;

means for moving the display position of one of said hour hand and said minute hand based upon whether the radial distance to the selected point is closer to the radial distance from said clock origin to the end of the hour hand or the end of the minute hand; and means for resetting said real-time clock in response to said clock-resetting stroke.

4. An apparatus as recited in claim 3 wherein said means for displaying an image of an analog clock displays said image with a current time provided by said real-time clock.

5. An apparatus as recited in claim 4 further comprising means for updating said image of said analog clock in response to said clock-resetting stroke.

6. An apparatus as recited in claim 5 wherein said means for detecting a clock-resetting stroke comprises means for detecting a clock hand-like stroke made at a new clock-hand position on said image of said analog clock.

7. A method as recited in claim 1 wherein the selected point in said stroke is an end point of said stroke that is farthest from the origin of said analog clock face.

* * * * *